R. BLAKOE.
DISK WHEEL FOR VEHICLES.
APPLICATION FILED NOV. 14, 1916.
1,276,165.
Patented Aug. 20, 1918
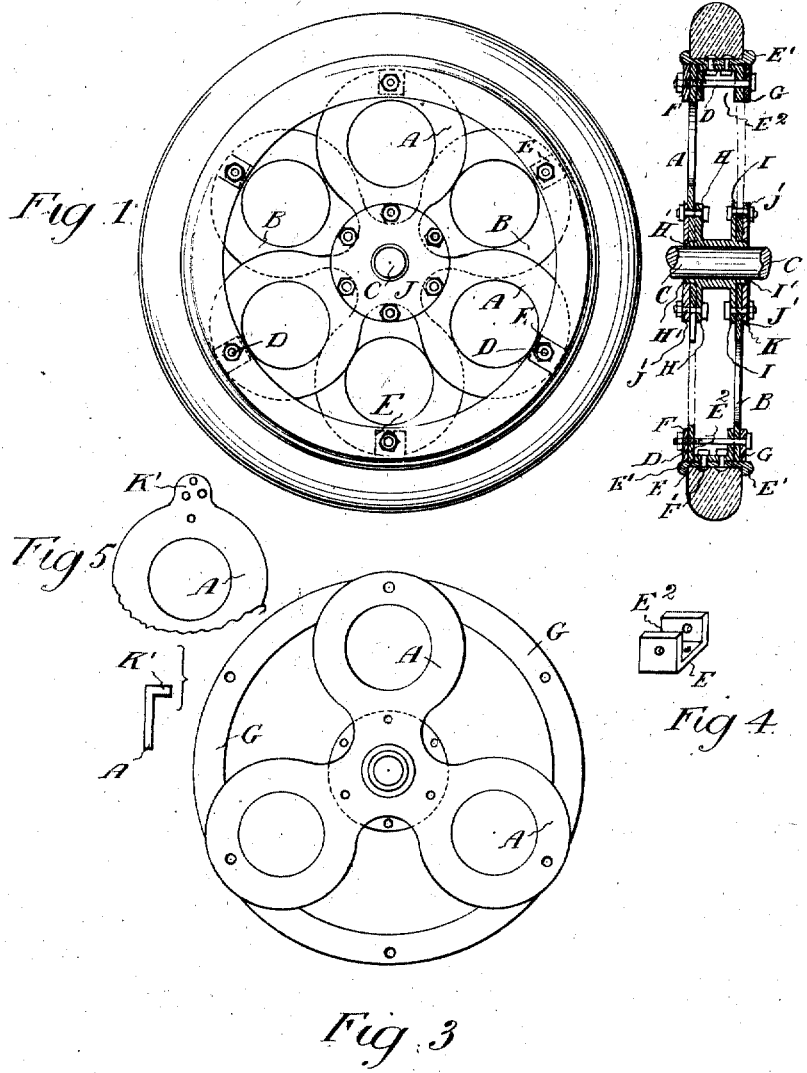

UNITED STATES PATENT OFFICE.

ROBERT BLAKOE, OF LONDON, ENGLAND.

DISK WHEEL FOR VEHICLES.

1,276,165.  Specification of Letters Patent.  Patented Aug. 20, 1918.

Application filed November 14, 1916. Serial No. 131,271.

*To all whom it may concern:*

Be it known that I, ROBERT BLAKOE, of 46 Bryanston street, Marble Arch, London, W., England, engineer, have invented certain new and useful Improved Disk Wheels for Vehicles, of which the following is a specification.

My invention relates to a disk wheel for vehicles, and consists of a special design of wheel in metal composed of a trefoil or trefoils, and when two of these trefoils are used coaxially and mounted side by side in my special design, I produce a strong, light and efficient wheel.

According to my invention, two trefoils preferably constitute the wheel, the circles of the second trefoil being placed on the opposite side of the hub, the disposition being such that the two trefoils do not coincide; the circles on the one side of the hub occupy the spaces on the other side. The trefoil on one side is equal in strength to a full disk, but lighter. Each disk has a hole in its center.

I provide cross-pieces which are suitably fastened to the wheel rim, one side being bolted or otherwise connected to the disk, while the other side is connected to a circular rim flange, and as the circles or trefoils are not opposite to each other, it follows that the rim brackets will be used for a trefoil circle on one side, and the flange on the same bracket on the other side, so that the brackets on one side secure the three circles of trefoil, and on the other the flange is secured in three places to the same brackets.

The hub for such wheel consists of a tube having two ribs or flanges, the trefoil being put on from each side, and a ring flange being then put on and bolted to each side and into the tube flange.

In order that my invention may be properly understood and readily carried into effect, I have hereunto appended one sheet of drawings, of which—

Figure 1 is a side elevation of a wheel made in accordance with and constituting my invention.

Fig. 2 is a transverse section of the same.

Fig. 3 is a side elevation of the wheel with the rim, tire, rim flange and one of the trefoils removed, in order to more clearly illustrate the one that remains.

Fig. 4 is a perspective view of one of the rim brackets for carrying the outer circles of the trefoils and the rim flanges, and Fig. 5 illustrates a side elevation and end view respectively of a part of a trefoil showing a lip formed on the apex of the circle, all hereafter more fully referred to and described.

With reference to the drawings, A and B indicate the two trefoils which compose the body of the wheel. These trefoils are carried on the hub C of the wheel and are disposed in such a manner relative with each other that the position of A does not coincide with the position of B, the circles of the trefoils A on one side of the hub C occupying the spaces formed by the trefoil B on the other side of said hub. The extremities of the circles comprising the trefoils A and B aforesaid are held rigidly in position by bolts D or other convenient means. These bolts pass through holes formed in brackets E of channel formation attached to the inner circumference of the rim $E^1$ of the wheel by rivets $F^1$, or such like. The trefoils A and B are both carried on the exterior sides of the brackets. The channel $E^2$ intervening determines the space between these two devices. The two rim flanges F, G, are carried by the aforesaid bolts D laterally and on the exterior side of the two trefoils. The bolts may be augmented for strength if found necessary. The hub consists of a sleeve with ribs or flanges H, I, constituting a bracket of channel formation and terminating on either side with tube extensions $H^1$, $I^1$, for receiving laterally the centers of the trefoils A and B aforesaid. In order to rigidly retain the trefoils centrally in their proper position, hub flanges J, K, are employed and these are placed on the tube extensions $H^1$, $I^1$ on either side of the hub. Short bolts $J^1$ pass through the hub flanges J, K aforesaid, and through holes made in the ribs or flanges H, I of the hub sleeve. Interposed and clamped between the hub flanges and the ribs or flanges H and I, are the inner central portions of the two trefoils.

Referring to Fig. 5, the trefoils may be formed with an extension $K^1$ forming a lip on the periphery of the circles of the trefoils which when bent over may conveniently be riveted, welded, or otherwise attached to the rim. Holes are shown in said extension and these may be used when riveting is resorted to.

Claim:

In a wheel of the type set forth, trefoils constituting the body of the wheel, ribs or flanges formed on a sleeve constituting the hub and hub flanges with bolts for carrying the trefoils in their central position, brackets of channel formation riveted to the rim, the rim flanges with transverse bolts or such like for carrying said trefoils at the apexes of the circles.

In witness whereof I affix my signature in the presence of two witnesses.

ROBERT BLAKOE.

Witnesses:
 JOHN LIDDLE,
 JOHN TRAIN LIDDLE.